United States Patent [19]
Beckstrom

[11] Patent Number: 5,795,006
[45] Date of Patent: Aug. 18, 1998

[54] ANTI-SKID VEHICLE CARGO BED INSERT

[76] Inventor: John D. Beckstrom, P.O. Box 427, Ashville, N.Y. 14710

[21] Appl. No.: 683,968

[22] Filed: Jul. 22, 1996

[51] Int. Cl.[6] .................................................. B60R 13/01
[52] U.S. Cl. .................................... 296/39.2; 296/41
[58] Field of Search .......................... 296/39.1, 39.2, 296/376, 41

[56] References Cited

U.S. PATENT DOCUMENTS

| | | |
|---|---|---|
| 2,057,873 | 10/1936 | Atwood . |
| 2,143,285 | 1/1939 | Schofield ................................. 296/41 |
| 3,814,473 | 6/1974 | Lorenzen, Jr. .......................... 296/39 R |
| 4,029,354 | 6/1977 | Valeri . |
| 4,091,149 | 5/1978 | Oxendine . |
| 4,128,271 | 12/1978 | Gray ........................................ 296/39 R |
| 4,161,335 | 7/1979 | Nix et al. ................................ 296/39 R |
| 4,162,098 | 7/1979 | Richardson, III ..................... 296/39 R |
| 4,693,507 | 9/1987 | Dresen et al. . |
| 4,958,876 | 9/1990 | Diaco et al. . |
| 4,960,301 | 10/1990 | Fry et al. ............................... 296/39.2 |
| 4,971,356 | 11/1990 | Cook ....................................... 280/759 |
| 4,974,895 | 12/1990 | Davenport .............................. 296/39.2 |
| 4,991,899 | 2/1991 | Scott . |
| 5,007,670 | 4/1991 | Wise . |
| 5,165,747 | 11/1992 | Stringer et al. . |

*Primary Examiner*—Gary C. Hoge
*Attorney, Agent, or Firm*—Nath & Associates; Gary M. Nath; Karen Lee Orzechowski

[57] ABSTRACT

An anti-skid vehicle cargo bed insert for use in the cargo bed of a vehicle is disclosed. The cargo beds and/or liners used in the cargo bed typically have ridges and valleys. The anti-skid vehicle cargo bed insert has a base portion with a top surface and a bottom surface opposite the top surface. At least one leg extends from the bottom surface of the base portion. The leg is formed so as to fit within a valley of the cargo bed.

17 Claims, 2 Drawing Sheets

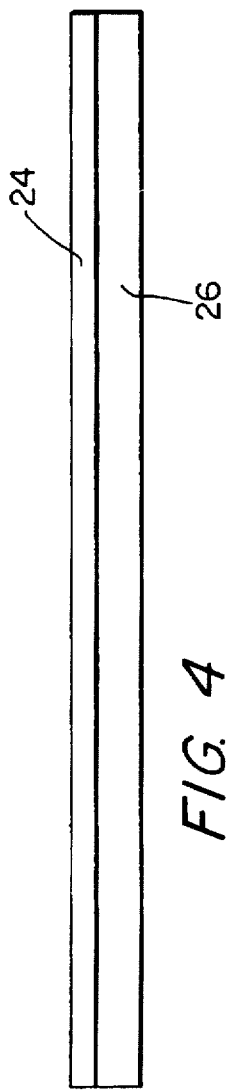
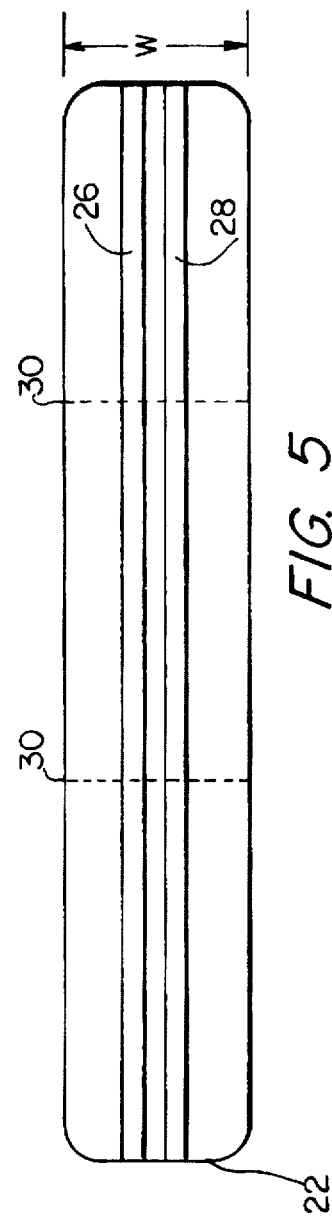
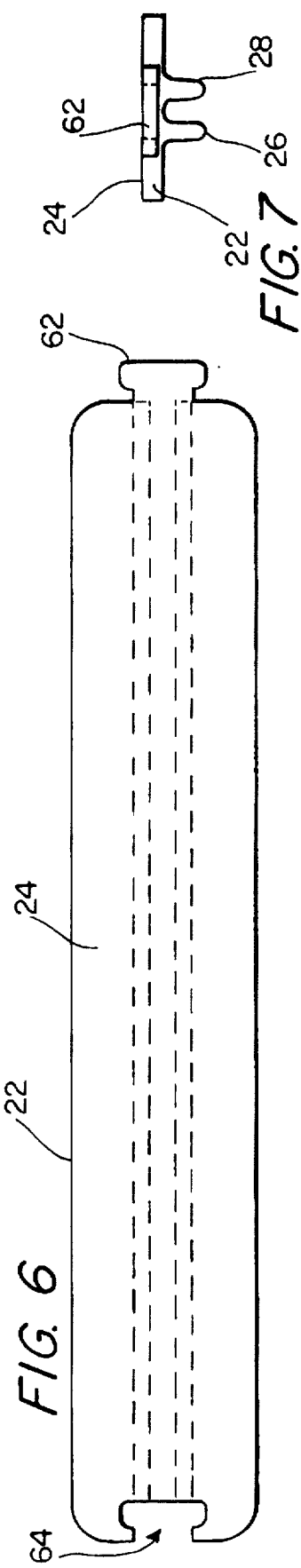

ANTI-SKID VEHICLE CARGO BED INSERT

FIELD OF THE INVENTION

The present invention relates generally to vehicle cargo bed liners, and, more particularly, to inhibiting slipping and sliding of materials placed in the cargo area of pick-up trucks.

DESCRIPTION OF THE PRIOR ART

Cargo vehicles and particularly pick-up trucks have long been utilized as working vehicles, and have in recent years become accepted for use as family cars. Pick-up trucks have also of recent years gained popularity as sport vehicles. Because of the multiple uses of pick-up trucks, attempts have been made to adapt the same pick-up truck to allow usage as a working vehicle in some instances and a family car in other instances.

When the pick-up truck is utilized as a working vehicle, the aesthetic appearance of the pick-up truck is of little concern to the user. However, when the same pick-up truck is to be utilized as a family car, or as a sport vehicle, the aesthetic appearance of the pick-up truck is of much greater importance to the user.

Many attempts to adapt such vehicles for dual usage provides some sort of protective liner positioned in the cargo area or bed of the pick-up truck to prevent the bed area and the associated walls from scratches, chips and dents resulting from the hauling of cargo in the truck cargo bed. Numerous liners are known in the art including those disclosed in U.S. Pat. No. 5,165,747 to Stringer et al, U.S. Pat. No. 4,991,899 to Scott, U.S. Pat. No. 4,958,876 to Diaco et al, and U.S. Pat. No. 4,693,907 to Dresen et al. The aforementioned patents disclose a truck bed liner and/or protective insert for the truck bed of a pick-up truck or similar vehicle.

One disadvantage of the prior art truck bed liners is that they are formed of a hard smooth material with a low coefficient of friction which permits items placed on the liner to slide about freely while the vehicle is in motion. This commonly occurs, for example, while transporting items when the cargo area is not packed full, when items are not secured in place or when the truck is being used as a family vehicle to transport boxes of groceries or packages. The sliding about can damage both the items themselves and the bed or bed liner of the pick-up. It would be advantageous if such packages would not slide freely about the vehicle.

SUMMARY OF THE INVENTION

The present invention generally comprises an anti-skid vehicle cargo bed insert for use in the cargo bed of a vehicle. The cargo beds and/or liners used in the cargo bed typically have ridges and valleys. The anti-skid vehicle cargo bed insert has a base portion with a top surface and a bottom surface opposite the top surface. At least one leg extends from the bottom surface of the base portion. The leg is formed so as to fit within a valley of the cargo bed.

In use the anti-skid vehicle cargo bed insert is placed on the cargo or bed liner with the leg inserted in a valley between two adjacent ridges. Items to be carried in the bed of the pick-up truck are then be placed so that the bulk of their weight rests on the anti-skid vehicle cargo bed insert.

In one embodiment, the top surface of the base portion is formed of a material having a high coefficient of friction so that packages placed on top of the anti-skid vehicle cargo bed insert will be inhibited from sliding about.

The attendant advantages of the present invention will be readily understood from the following specification and claims, and by reference to the appended drawings.

BRIEF DESCRIPTION OF THE DRAWINGS

The present invention will be more fully understood by reference to the following detailed description of the preferred embodiments of the present invention when read in conjunction with the accompanying drawings, in which like reference characters refer to like parts throughout the views and in which:

FIG. 4 is a side view of an anti-skid vehicle cargo bed insert constructed according to the principles of the present invention;

FIG. 5 is a bottom view of an anti-skid vehicle cargo bed insert constructed according to the principles of the present invention;

FIG. 6 is a top view of an anti-skid vehicle cargo bed insert constructed according to the principles of the present invention; and FIG. 7 is an end view of an anti-skid vehicle cargo bed insert constructed according to the principles of the present invention.

DETAILED DESCRIPTION OF THE PREFERRED EMBODIMENTS

Figure 1:
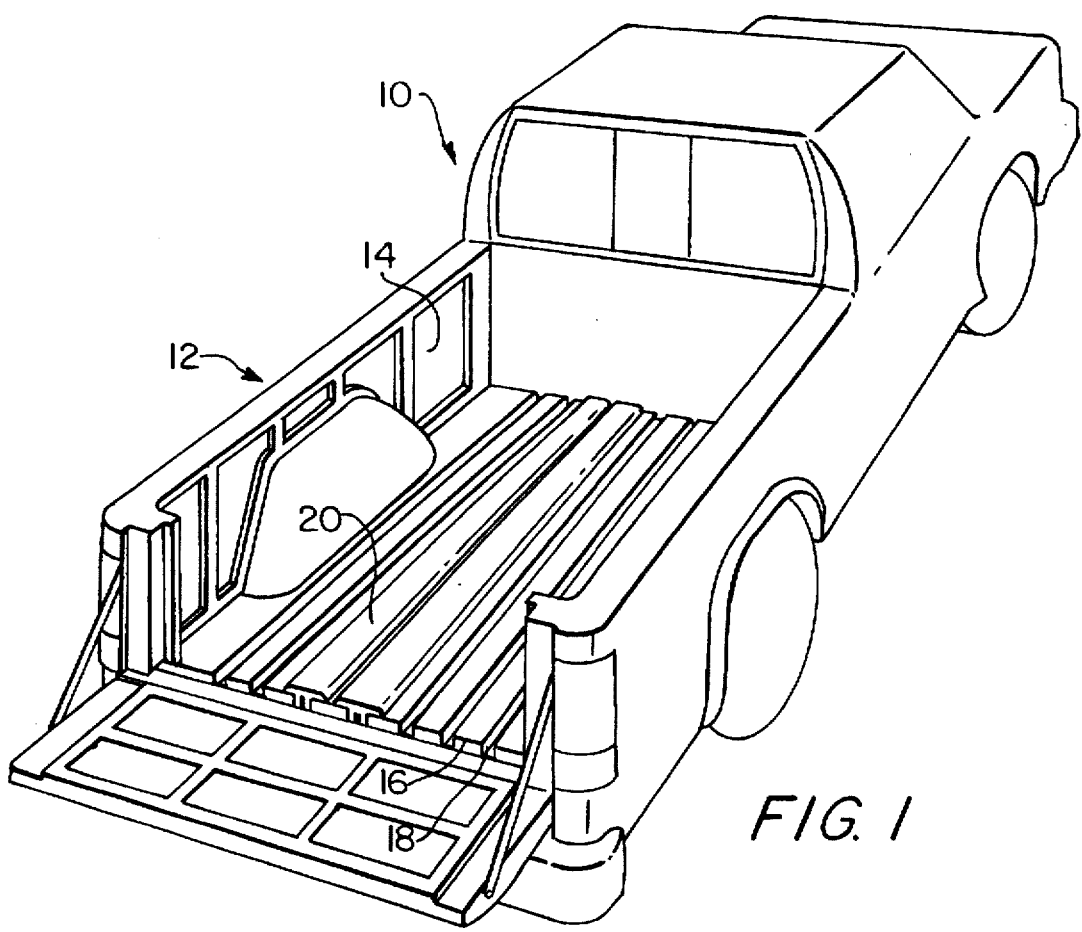
FIG. 1 is a perspective view of a bed of a pick-up truck employing an anti-skid vehicle cargo bed insert constructed according to the principles of the present invention.
Figure 2:
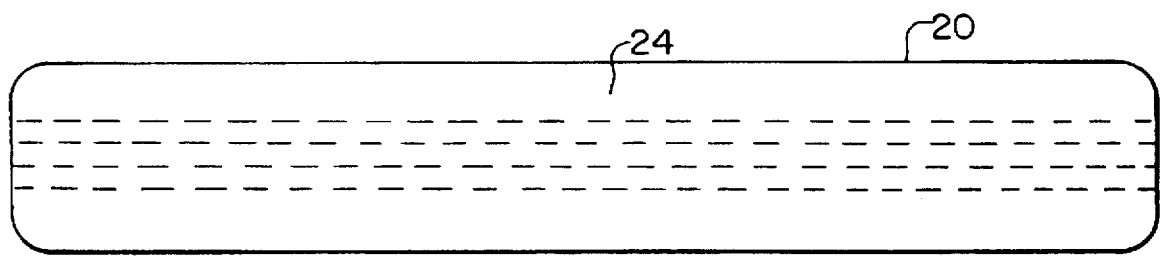
FIG. 2 is a top view of an anti-skid vehicle cargo bed insert constructed according to the principles of the present invention.
Figure 3:
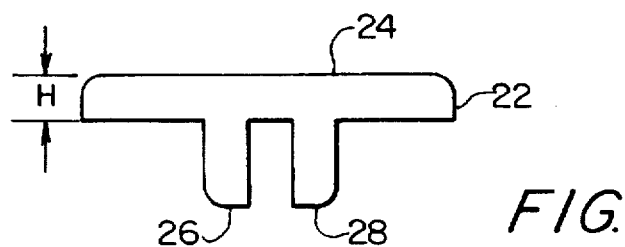
FIG. 3 is an end view of an anti-skid vehicle cargo bed insert constructed according to the principles of the present invention.

Referring to FIG. 1, a pick-up truck indicated generally at 10 has a bed or cargo area 12 within which is a bed liner 14. The bed liner 14 includes a series of ridges 16 and valleys 18. The anti-skid vehicle cargo bed insert 20 is shown disposed in the bed liner 14.

Referring to FIGS. 2–5, the anti-skid vehicle cargo bed insert 20 includes base portion 22 with a top surface 24. The top surface 24 preferably has a very high coefficient of friction such that packages and/or items placed on top of the anti-skid vehicle cargo bed insert 20 are inhibited from sliding. The anti-skid vehicle cargo bed insert 20 can be preferably formed of an elastomeric material such as a thermoplastic elastomer. In a preferred embodiment, the base portion has a width, indicated as W in FIG. 5, of 1.75 inches and a height, indicated as H in FIG. 3, of 0.20 inches.

A first leg 26 and a second leg 28 both extend downwardly from the base portion 22. Preferably, the base portion 22 and the legs 26 and 28 are formed as a single piece. The two legs 26, 28 are preferably spaced apart from each other such that they form a friction fit within a valley 18 of bed liner 14 with sufficient friction to hold the anti-skid vehicle cargo bed insert firmly in place while allowing it to be easily inserted. The legs are preferably of a height such that when the anti-skid vehicle cargo bed insert is installed, the legs extend from the bottom of a valley 18 to the top of a ridge 16. Contact between the bottom of the legs and the bottom of a valley or between the bottom of the base portion and the top of a ridge is typically sufficient to hold the anti-skid vehicle cargo bed insert in place. In a preferred embodiment, the height of each leg is 0.4 inches, the distance between the legs, center to center, is 0.395 inches, and each leg is 0.188 inches thick. Alternatively, for bed liners having very narrow ridges 16, the legs 26, 28 are spaced apart such that a ridge 16 of bed liner 14 will fit between the two legs. It is also possible to construct the present invention without any space between the two legs or to use a single leg.

The width of the base portion 22 described as dimension W in FIG. 5, is preferably sufficient to extend across a valley 20. Alternatively, the width of the base portion 22 can be such that two adjoining anti-skid vehicle cargo bed inserts 20 meet or nearly meet on the intervening at the center of the intervening ridge 16. Further, multiple inserts can be formed as a single piece with the base portions joined along their longest sides such that a single insert (comprised of multiple inserts joined together) would cover multiple ridges and valleys.

As shown in FIGS. 6 and 7, the anti-skid vehicle cargo bed insert of the present invention are preferably formed with a tab 62 and a locking slot 64. Tabs from one insert can be mated with the slot of a second insert to join the inserts together. In that manner two or more inserts can be joined together to form a longer insert. The individual inserts can also be simply separated when a smaller insert is desired.

The anti-skid vehicle cargo bed insert of the present invention can be formed in varying overall lengths suited to particular uses. Small inserts are suitable for use with a small number of grocery bags or small packages. Longer inserts are suitable for more numerous items that take up more of the floor space of the cargo area. In one embodiment the inserts are manufactured in long strips with weakened portions (perforations) 30 (see FIG. 5) at regular intervals to aide in separating the long strips into smaller portions as dictated by particular uses.

In use the anti-skid vehicle cargo bed insert 20 is placed on the bed liner with legs 26, 28 inserted in a valley 18 between two adjacent ridges 16 of the bed liner. Preferably, two or more strips are typically used, depending on the size and number of the items to be loaded in the truck. Items to be carried in the bed of the pick-up truck are then be placed so that the bulk of their weight rests on the anti-skid vehicle cargo bed insert 20. When items are not being transported, the anti-skid vehicle cargo bed insert 20 can easily be removed and stored under the seat of the pick-up truck or in an alternate convenient location.

The above described arrangements are merely illustrative of the principles of the present invention. Numerous modifications and adaptations thereof will be readily apparent to those skilled in the art without departing from the spirit and scope of the present invention. Accordingly, the embodiments illustrated and discussed in the accompanying specification and drawings should be taken as exemplary in nature and the scope and spirit of the invention should be limited only by the following claims.

What is claimed is:

1. An anti-skid vehicle cargo bed insert for use in the cargo bed of a vehicle, the cargo bed having alternating ridges and valleys, said anti-skid vehicle cargo bed insert comprising:
    a generally planar base portion having a top surface bounded by first and second edges, and a bottom surface opposite said top surface, a width of said base portion being sufficient to cover one of said valleys and at least a portion of one of said ridges; and
    at least one leg extending from said bottom surface of said base portion at a location remote from said first and second edges, said at least one leg formed so as to fit within a valley of the cargo bed.

2. An anti-skid vehicle cargo bed insert as set forth in claim 1, wherein said top surface of said base portion has an effectively high coefficient of friction to restrain movement of cargo which is placed on said insert.

3. An anti-skid vehicle cargo bed insert as set forth in claim 1, wherein said insert is formed of a thermoplastic elastomer.

4. An anti-skid vehicle cargo bed insert as set forth in claim 1, wherein said at least one leg comprises two legs arranged so as to create a friction fit within a valley of the cargo bed.

5. An anti-skid vehicle cargo bed insert as set forth in claim 1, wherein said at least on leg comprises two legs spaced apart from each other such that a ridge of the cargo bed can fit between said two legs.

6. An anti-skid vehicle cargo bed insert as set forth in claim 1, further including means for allowing multiple inserts to be joined together.

7. An anti-skid vehicle cargo bed insert as set forth in claim 2, further including
    a tab at one end of said base portion;
    a locking slot at an end of said base portion opposite said tab.

8. An anti-skid vehicle cargo bed insert for use in the cargo bed of a vehicle, the cargo bed having alternating ridges and valleys, said anti-skid vehicle cargo bed insert comprising:
    a base portion having a top surface bounded by first and second edges, and a bottom surface opposite said top surface, said top surface being formed of a generally high-friction material whereby to restrain movement of cargo which is placed on said insert, a width of said base portion being sufficient to cover one of said valleys and at least a portion of said ridges; and
    a leg extending from said bottom surface of said base portion at a location remote from said first and second edges, said leg formed so as to fit within a valley of the cargo bed.

9. An anti-skid vehicle cargo bed insert as set forth in claim 8, further including a weakened portion extending across said top portion and said leg to permit said insert to be separated into two parts.

10. An anti-skid vehicle cargo bed insert as set forth in claim 8, wherein said insert is formed as a single piece of a thermoplastic elastomer.

11. An anti-skid vehicle cargo bed insert as set forth in claim 8, wherein said leg is configured so as to create a friction fit within a valley of the cargo bed.

12. An anti-skid vehicle cargo bed insert as set forth in claim 8, wherein said leg comprises two elements spaced apart from each other such that a ridge of the cargo bed can fit between said two elements.

13. An anti-skid vehicle cargo bed insert as set forth in claim 8, further including
    a tab at one end of said base portion; and
    a locking slot at an end of said base portion opposite said slot,
    whereby a first anti-skid vehicle cargo bed insert can be joined to a second anti-skid vehicle cargo bed insert by mating the tab of the first insert with the locking slot of said second insert.

14. An anti-skid vehicle cargo bed insert for use in the cargo bed of a vehicle, the cargo bed having ridges and valleys, said anti-skid vehicle cargo bed insert comprising:
    a base portion having a top surface and a bottom surface opposite said top surface;

a tab at one end of said base portion;

a locking slot at an end of said base portion opposite said tab; and at least one leg extending from said bottom surface of said base portion, said at least one leg formed so as to fit within a valley of the cargo bed.

15. An anti-skid vehicle cargo bed liner as set forth in claim 1, wherein multiple inserts are aligned in a manner to cover multiple valleys and ridges of said cargo bed.

16. An anti-skid vehicle cargo bed liner as set forth in claim 8, wherein multiple inserts are aligned in a manner to cover multiple valleys and ridges of said cargo bed.

17. An anti-skid vehicle cargo bed liner as set forth in claim 14, wherein multiple inserts are aligned in a manner to cover multiple valleys and ridges of said cargo bed.

* * * * *